미국 특허 US 11,334,376 B2

(12) United States Patent
Kim et al.

(10) Patent No.: US 11,334,376 B2
(45) Date of Patent: May 17, 2022

(54) EMOTION-AWARE REACTIVE INTERFACE

(71) Applicant: Samsung Electronics Co., Ltd, Suwon-si (KR)

(72) Inventors: Jihee Kim, Mountain View, CA (US); Abhijit Bendale, Sunnyvale, CA (US); Zhihan Ying, Hangzhou (CN); Simon Gibbs, San Jose, CA (US); Lu Luo, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 16/184,601

(22) Filed: Nov. 8, 2018

(65) Prior Publication Data

US 2019/0250934 A1 Aug. 15, 2019

Related U.S. Application Data

(60) Provisional application No. 62/630,072, filed on Feb. 13, 2018.

(51) Int. Cl.
| | |
|---|---|
| *G06K 9/00* | (2022.01) |
| *G06F 9/451* | (2018.01) |
| *G06F 3/0481* | (2022.01) |
| *G06F 3/01* | (2006.01) |
| *H04M 1/72436* | (2021.01) |

(52) U.S. Cl.
CPC ............ *G06F 9/453* (2018.02); *G06F 3/011* (2013.01); *G06F 3/0481* (2013.01); *G06K 9/00302* (2013.01); *G06K 9/00335* (2013.01); *G06K 9/00355* (2013.01); *H04M 1/72436* (2021.01)

(58) Field of Classification Search
CPC . G06F 3/04817; H04L 51/04; H04L 12/1813; H04N 21/4788; A63F 13/87
See application file for complete search history.

(56) References Cited

U.S. PATENT DOCUMENTS

| | | | |
|---|---|---|---|
| 7,944,448 B2 | 5/2011 | Iwamura et al. | |
| 9,241,664 B2 | 1/2016 | Phan et al. | |
| 9,536,329 B2 | 1/2017 | Saxena et al. | |
| 9,767,349 B1 | 9/2017 | Shreve et al. | |
| 2006/0170945 A1* | 8/2006 | Bill | H04L 29/06 358/1.13 |
| 2007/0074114 A1* | 3/2007 | Adjali | G06F 3/01 715/706 |
| 2008/0240563 A1* | 10/2008 | Takano | G06K 9/00302 382/173 |
| 2014/0307926 A1* | 10/2014 | Murakami | G06T 7/20 382/107 |
| 2016/0128617 A1 | 5/2016 | Morris et al. | |
| 2017/0053082 A1 | 2/2017 | Pereira et al. | |
| 2017/0206694 A1 | 7/2017 | Jiao et al. | |
| 2017/0364484 A1 | 12/2017 | Hayes | |
| 2017/0365277 A1 | 12/2017 | Park | |

FOREIGN PATENT DOCUMENTS

KR 10-20150143570 A 12/2015

* cited by examiner

*Primary Examiner* — Rinna Yl

(57) ABSTRACT

A computer-implemented method of providing an emotion-aware reactive interface in an electronic device includes receiving an image of a user as an input and identifying a multi-modal non-verbal cue in the image. The method further includes interpreting the multi-modal non-verbal cue to determine a categorization and outputting a reactive interface event determined based on the categorization.

14 Claims, 9 Drawing Sheets

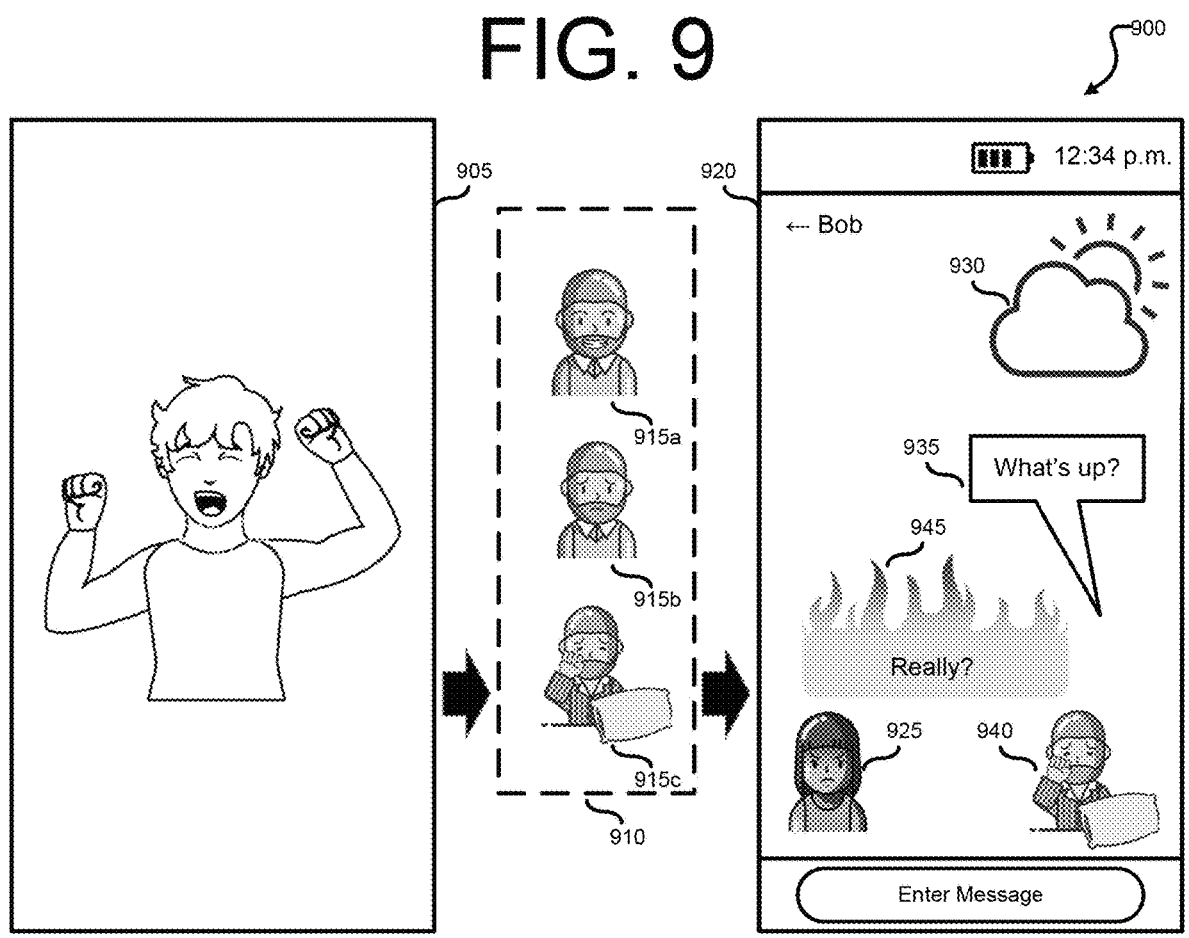

EMOTION-AWARE REACTIVE INTERFACE

CROSS-REFERENCE TO RELATED APPLICATION AND CLAIM OF PRIORITY

This application claims priority under 35 U.S.C. § 119(e) to U.S. Provisional Patent Application No. 62/630,072 filed on Feb. 13, 2018. The above-identified provisional patent application is hereby incorporated by reference in its entirety.

TECHNICAL FIELD

This disclosure relates generally to computer vision. More specifically, this disclosure relates to systems and methods for providing an emotion-aware reactive interface.

BACKGROUND

Certain processor-powered apparatus, (for example, smartphones) have sensors capable of receiving a variety of inputs, including without limitation, cameras, microphones, and touchscreens, and can support varying degrees of multi-modal interaction between users and devices. For example, a user of a texting, or communications application on her smartphone may provide both textual inputs (for example, message text), as well as graphical inputs (for example, emoticons or "emojis") to provide additional context to her textual inputs. To support this multi-modal interaction, the user's phone requires an interface capable of receiving textual and graphical inputs. In many cases, the interface is passive or inactive with regard to providing graphical content. For example, while an interface may propose candidate words for completing textual entries, a user may be required to perform an unassisted and inefficient search (for example, by scrolling within a bank of images) through a library of emojis, filters, fonts or other sources of graphical content to identify and select relevant graphical inputs for contextually enriching her textual inputs.

Further, the range of multi-modal inputs presently recognized by electronic devices comprises only a subset of the range of multi-modal expressions people use when interacting with one another. As a non-limiting example, in many languages, there are words or expressions which are frequently used, and which, in conjunction with various non-verbal cues, can be used to efficiently convey a wide range of possible meanings. Examples of such words include "Really" in English, "Doch" in German and "Ne" in Korean. For each of these words, the intended meaning of the word is typically identifiable from visual (for example, the speaker's facial expression or gestures) or other contextual clues, such as the speaker's inflection, pose or gestures. Thus, providing interfaces by which processor-powered electronic devices which can accurately and responsively recognize and convert multi-modal user inputs into events which can be utilized by applications remains a source of technical challenges and opportunities to improve the functionality of computers and other processor-powered apparatus.

SUMMARY

This disclosure provides an emotion-aware reactive interface.

In a first embodiment, a computer-implemented method of providing an emotion-aware reactive interface in an electronic device includes receiving an image of a user as an input and identifying a multi-modal non-verbal cue in the image. The method further includes interpreting the multi-modal non-verbal cue to determine a categorization and outputting a reactive interface event determined based on the categorization.

In a second embodiment, an apparatus includes a processor and a memory. Further, the memory contains instructions, which when executed by the processor, cause the apparatus to receive an image of a user as an input and identify a multi-modal non-verbal cue in the image. Additionally, when executed by the processor, the instructions cause the apparatus to interpret the multi-modal non-verbal cue to determine a categorization, and output a reactive interface event determined based on the categorization.

In a third embodiment, a non-transitory computer-readable medium includes program code, which, when executed by a processor, causes an apparatus to receive an image of a user as an input and identify a multi-modal non-verbal cue in the image. Further, when executed by the processor, the program code cause the apparatus to interpret the multi-modal non-verbal cue to determine a categorization, and output a reactive interface event determined based on the categorization.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 9 illustrates operational aspects of an example of an emotion-aware reactive interface according to various embodiments of this disclosure.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
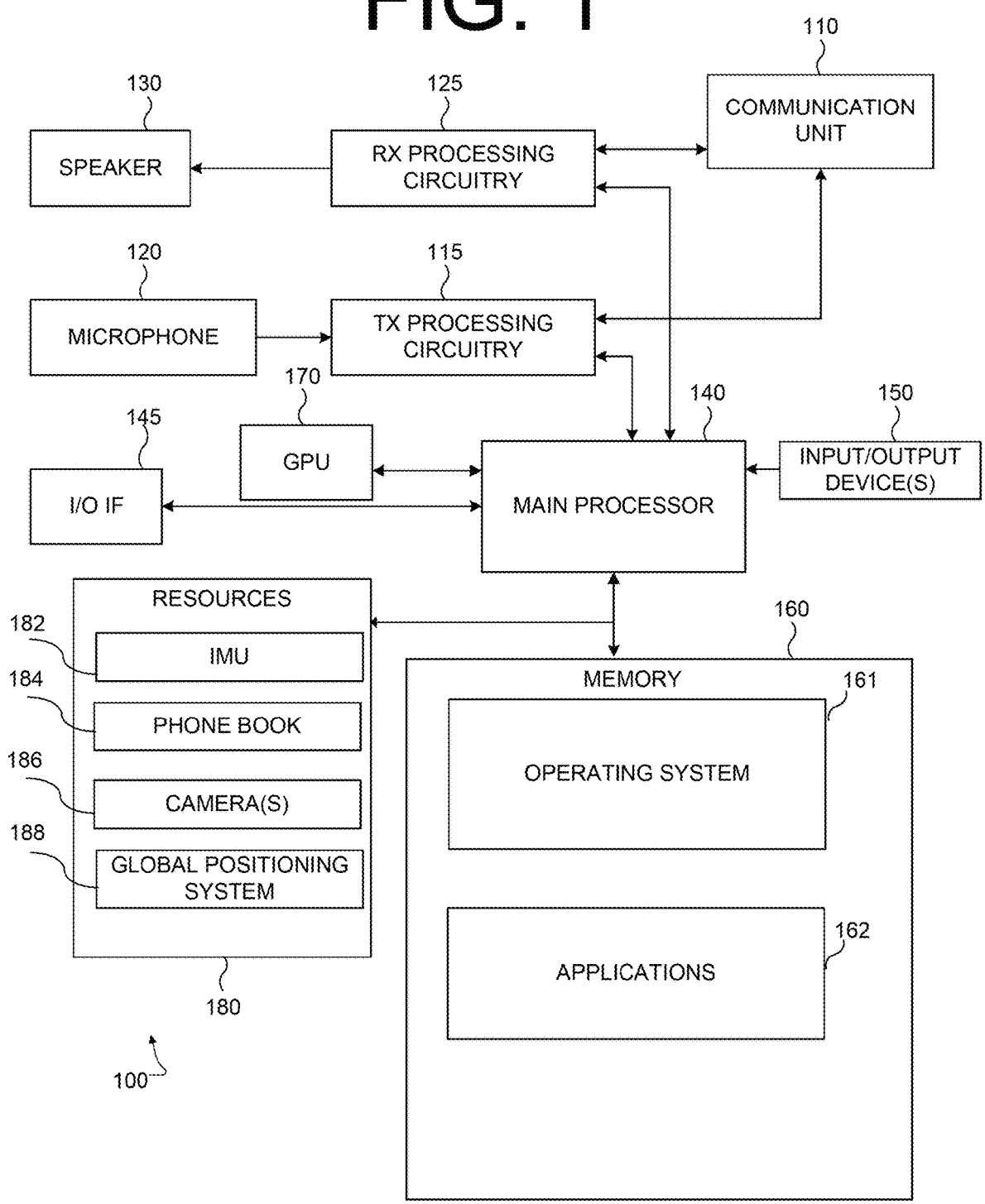
FIG. 1 illustrates an example of an electronic device for providing an emotion-aware reactive interface according to various embodiments of this disclosure.

FIG. 1 illustrates a non-limiting example of a device for providing an emotion-aware reactive interface according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume or otherwise utilize events generated by an emotion-aware reactive interface, including, without limitations, communication applications (for example, texting applications), social media applications, games and medical applications.

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1. For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a user's phone book 184, one or more cameras 186 of device 100, and a global positioning system 188.

Although FIG. 1 illustrates one example of a device 100 for providing an emotion-aware reactive interface, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
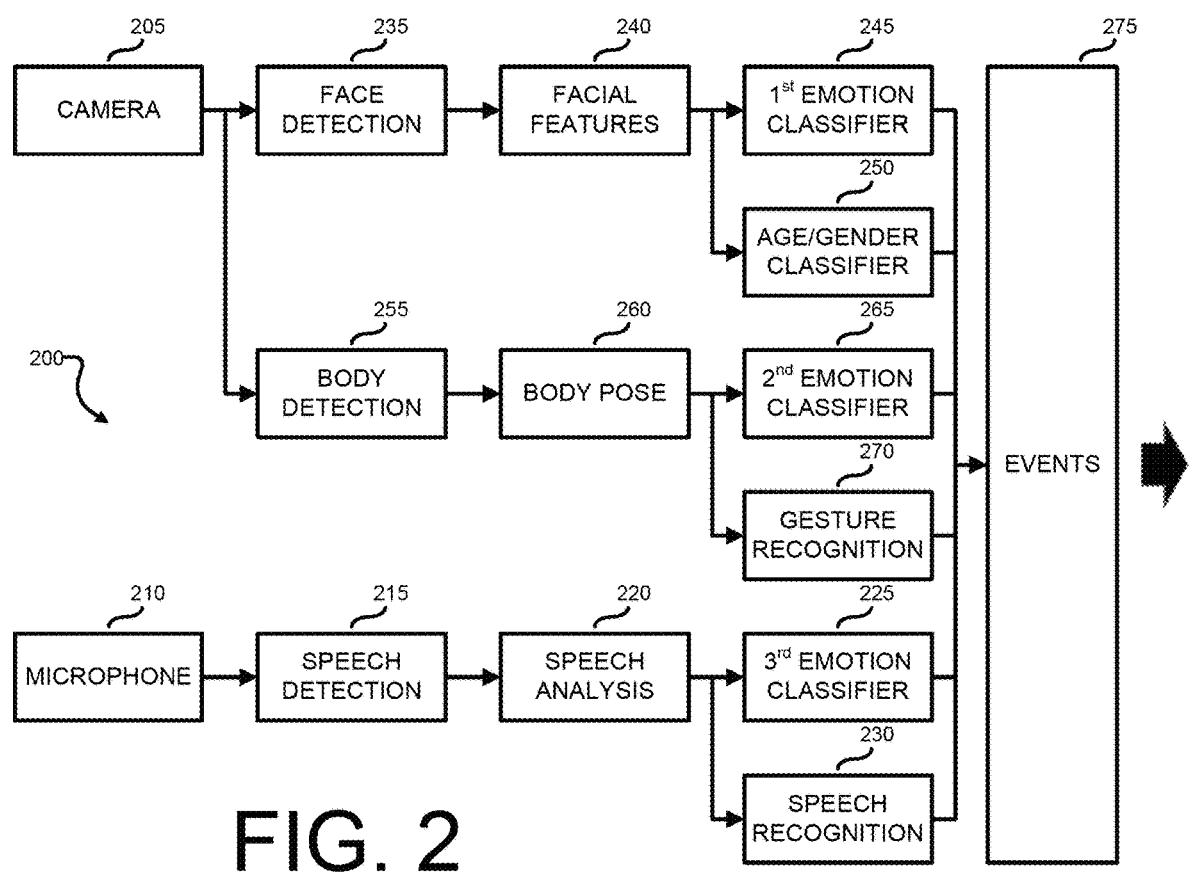
FIG. 2 illustrates an example of a system architecture for implementing an emotion-aware reactive interface according to certain embodiments of this disclosure.

FIG. 2 illustrates an example of a system architecture 200 for implementing an emotion-aware reactive interface according to various embodiments of this disclosure. The example system architecture 200 shown in FIG. 2 is for illustration only and other embodiments could be used without departing from the scope of the present disclosure.

Referring to the non-limiting example of FIG. 2, system architecture 200 is implemented on an electronic device (for example, device 100 in FIG. 1) comprising a processor, a memory, a camera 205 and a microphone 210. According to certain embodiments, camera 205 is a digital camera, with a photo sensor (for example, a charge coupled device ("CCD") or complementary metal oxide semiconductor ("CMOS")) sensor capable of generating image data in a size and format which can be utilized by a facial recognition algorithm. In some embodiments, microphone 210 is a microelectro-mechanical system ("MEMS") microphone, or any microphone sharing a context (for example, a microphone on the same device, or on a device paired to the camera, such as a smart phone/smart watch pair) with camera 205 and capable of converting audio signals into audio data of a size and format which can be utilized by a speech recognition algorithm.

In some embodiments, system architecture 200 generates reactive interface events 275 by passing inputs from camera 205 and microphone 210 through one or more pipelines of analysis and classification modules 215 through 270, from which one or more categorizations of the inputs are generated, and a reactive interface event 275 based on the categorizations is outputted.

For example, in certain embodiments, once captured and digitized, sound from a microphone 210 sharing a context with camera 205 is passed to a speech detection module 215. According to some embodiments, analysis and classification modules 215 through 270 (including speech detection module 215) are embodied as software executed by a processor of a device supporting system architecture 200. In some embodiments, analysis and classification modules 215 through 270 are embodied as one or more hardware components. In various embodiments, analysis and classification modules 215 through 270 are embodied as a combination of hardware and software.

In the non-limiting example of FIG. 2, speech detection module 215 receives, as an input audio data from microphone 210, and detects when a user is speaking. In some embodiments, speech detection module 215 outputs audio data, which has been processed to exclude background noise and quiet patches, and has been time-stamped so that a user's words received from microphone 210 at a specific point in time can be associated with, and processed in conjunction with, image data received from camera 205 at the same point in time.

Referring to the non-limiting example of FIG. 2, speech analysis module 220 receives, as an input, the output of speech detection module 215. In some embodiments, speech analysis module 220 further processes the audio data to identify cues in the audio data associated with an emotion or context of the audio data. For example, speech analysis module 220 may identify changes in pitch or volume in the audio data as cues associated with the user's emotion or a context of a user's statement. In certain embodiments, speech analysis module 220 may also output data as to a determined probability of a trait of the speaker. For example, the output of speech analysis module 220 may indicate that there is a 75% probability that the recorded speaker is male.

In various embodiments according to this disclosure, the output of speech analysis module 220 is provided to third emotion classifier module 225 and speech recognition module 230. According to various embodiments, third emotion classifier module 225 applies one or more pre-trained processing models to the output of speech analysis module 220 and outputs a determination of one or more emotional classifiers associated with the user's speech. In some embodiments, third emotion classifier module 225 outputs a vector of probabilities associated with a specified set of emotional categories (for example, a vector [0.5, 0.4, 0.1]

reflecting a 50% probability the speaker's emotion is "sad," a 40% likelihood the speaker's emotion is "angry," and a 10% probability that the speaker's emotion is "excited").

Referring to the non-limiting example of FIG. 2, speech recognition module 230 is configured to extract phonemes and build a candidate word stream from audio data output by speech analysis module 220. According to various embodiments, speech recognition module 230 may also tag words in the candidate word stream comprising cues which can be applied to a categorization of the speaker's emotional state or context of the speaker's words.

According to certain embodiments, in addition to passing the output of microphone 210 through a pipeline of an analysis and classification modules to obtain categorizations upon which a reactive interface event(s) 275 are based, system architecture 200 also provides for passing the output of other sensors or sources of contextual data through pipeline(s) of analysis and classification modules.

As shown in the non-limiting example of FIG. 2, image data from camera 205 is passed to face detection module 235 and body detection module 255. According to various embodiments, face detection module 235 identifies faces within image data from camera 205. In some embodiments, face detection module 235 crops the image, or otherwise reduces the volume of image data used for generating categorizations based on images of faces in an image captured by camera 205.

In certain embodiments, facial features recognition module 240 receives, from face detection module 235, image data associated with detected faces in the image data from camera 205 and identifies relevant features (for example, eyes and mouths) within the detected faces, whose appearance can provide a nonverbal cue predictably associated with an emotional or contextual category. According to various embodiments, facial features recognition module 240 applies one or more trained models (for example, a deep neural network trained model) to output data identifying facial feature patterns within the recognized faces.

In various embodiments according to the present disclosure, the output of facial features recognition module 240 is provided to first emotion classifier module 245 and age and gender classifier module 250.

Referring to the non-limiting example of FIG. 2, first emotion classifier module 245 receives data based on identified features in faces detected in an image, and determines one or more categories associated with the identified features. For example, in an image of a person pulling a "funny" face, the recognized facial features include a larger than expected ratio of sclera (the visible white part of an eyeball) to iris, which correlates to a wide open eye. Further, in this illustrative example, the recognized facial features may include an upturned mouth and an extended tongue. Based on these recognized features, first emotion classifier module 245 may determine "silly" or "nauseated" as emotional categories associated with a person having their eyes wide open and their tongue extended. Additionally, in some embodiments, first emotion classifier module 245, like third emotion classifier module 225, may output a vector corresponding to the relative probability of candidate emotions associated with the detected facial features.

According to various embodiments, age and gender classifier module 250 receives data associated with identified, relevant facial features from facial feature recognition module 240, and applies one or more models to the facial feature data to determine at least one of a determination of the sex or age of the faces recognized in the image data from camera 205. According to various embodiments, facial features recognition module 240 associates a combination of recognized facial features with an identifier of a person, and age and gender classifier module 250 performs a lookup operation to obtain information regarding the age and/or gender associated with a face recognized in an image.

As shown in the non-limiting example of FIG. 2, image data from camera 205 is also provided to body detection module 255. According to various embodiments, body detection module 255 applies one or more pre-trained models to identify bodies and body components (for example, hands, fingers, and heads) within the image, and output data specifying the identity and coordinates of the identified body parts.

In certain embodiments, body pose recognition module 260 receives the data output from body detection module 255, and determines a pose (e.g., "subject's arms crossed" or "subject seated") from the data showing the identity and coordinates of the body parts. Body pose recognition module outputs data representing one or more poses associated with the detected body parts, and provides the data to second emotion classifier module 265 and gesture recognition module 270.

According to various embodiments, second emotion classifier modules 265 applies one or more pre-trained models to body pose data 260 to determine one or more categorizations of the body pose data identified in the image data from camera 205. For example, body pose recognition module 260 may output data identifying a subject's posed as "crossed arms." from this second emotion classifier module may interpret the "crossed arms" pose data, and determine "angry" and "aggressive" as emotional categorizations associated with the "crossed arms" pose data. Further, according to certain embodiments, second emotion classifier module 265 may output a vector of the probabilities of the pose data matching candidate emotional categorizations.

In certain embodiments, gesture recognition module 270 receives the output from body pose recognition module 260 and determines whether the pose is associated with a gesture which can provide, at least in part, the basis for a reactive interface event. For example, gesture recognition module 270 may be configured to detect and generate data indicating the presence of gestures with generally understood contextual meaning (for example, a "thumbs up" gesture).

Referring to the non-limiting example of FIG. 2, the outputs of modules 225, 230, 245, 250, 265 and 270 provide the basis of reactive interface event 275. As used in this disclosure, the term reactive interface event encompasses a package of data that is based on which can be consumed or utilized as an input to an application, and which is based at least in part on an interpreted (for example, a facial expression, a gesture, or inflection of speech) user input with an electronic device. According to certain embodiments, reactive interface event 275 comprises the output of each of modules 225, 230, 245, 250, 265 and 270 expressed in a normalized format. In some embodiments, reactive interface event 275 is an item of data obtained through further processing of the outputs of modules 225, 230, 245, 250, 265 and 270, for example, a code corresponding to a combination of gender and gesture.

Although FIG. 2 illustrates one example of a system architecture for implementing an emotion-aware reactive interface, various changes may be made to FIG. 2. For example, while the example of FIG. 2 only specifies camera 205 and microphone 210 as inputs, in other embodiments, a system architecture may include inputs from other sensors (for example, a global positioning system sensor), as well as service data (for example, data from a weather service) or data obtained from the device (for example, contact or calendar information) implementing the emotion-aware reactive interface. Additionally, while in the non-limiting example of FIG. 2, each module receives an input from a single source, in certain embodiments, the modules may be configured to interact with, and provide inputs to one another.

Figure 3:
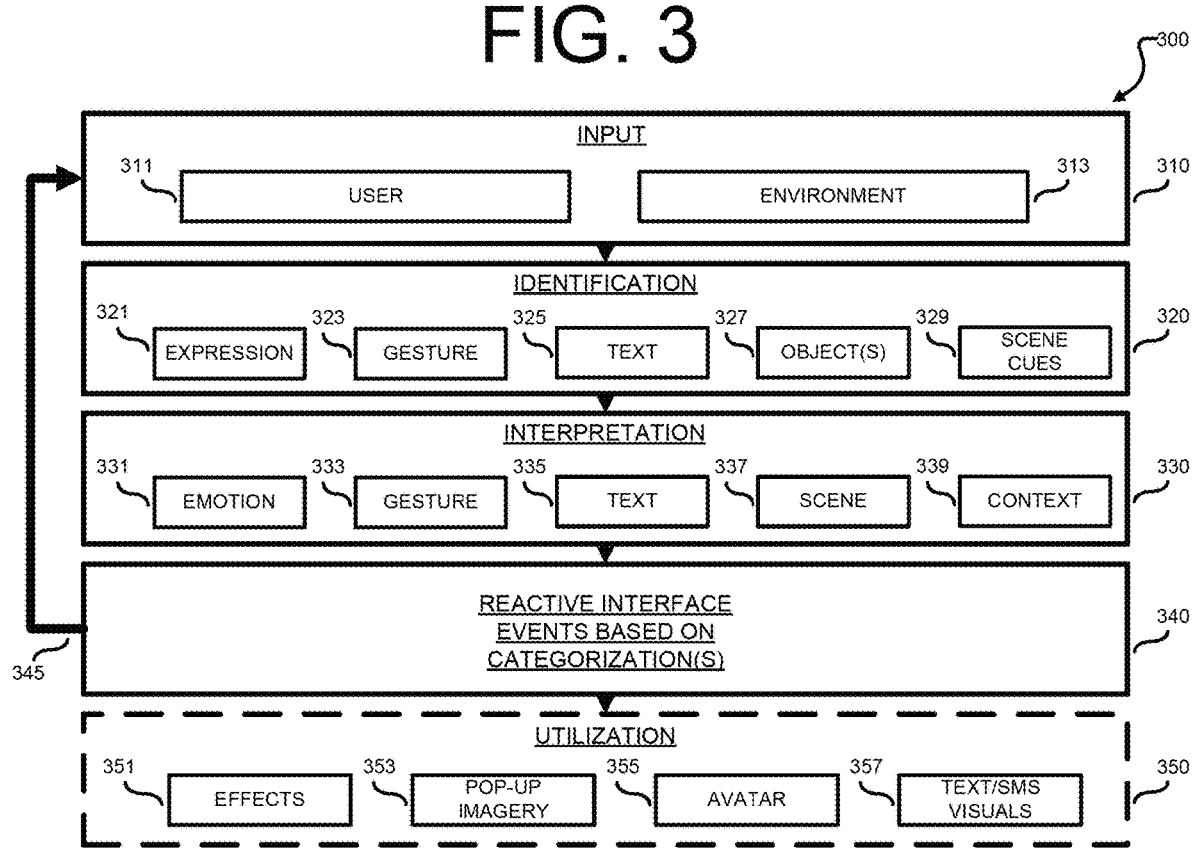
FIG. 3 illustrates an example of a data flow of an emotion-aware reactive interface according to some embodiments of the present disclosure.

FIG. 3 illustrates an example of a data flow 300 of an emotion-aware reactive interface according to some embodiments of this disclosure. The example of the data flow 300 shown in FIG. 3 is for illustration only and other examples could be used without departing from the scope of the present disclosure.

Referring to the non-limiting example of FIG. 3, data flow 300 comprises a four-layered progression by which a processor-powered device (for example, a tablet or smartphone) receives data associated with a user's non-verbal expression of emotion as well as relevant context and reactively outputs reactive interface events which can be consumed, or utilized by one or more applications.

According to various embodiments, the first layer of the data flow 300 of an emotion-aware reactive interface is an input data layer 310, wherein the interface receives the data used to generate reactive interface events. In the non-limiting example of FIG. 3, input data comprises user data 311 and environment data 313.

In some embodiments, user data 311 is data which is explicitly or implicitly associated with a user of an application. Examples of user data 311 which is explicitly associated with the user of an application include, without limitation, data stored on the user's device (for example, calendar, login, and address book data) as well as the user's direct interactions (for example, touch screen events, selections made within an application and typed text) with the application. Examples of user data 311 which is implicitly associated with a user of an application include, without limitation, image data located near a focal point of a device's camera, which, by its location and prominence in the image, can be associated with a user, or voice data from a microphone.

According to various embodiments, environment data 313 includes data about the user's environment. Environment data 313 includes, without limitation, temperature data, weather data, location data, and time of day.

Referring to the non-limiting example of FIG. 3, the second layer of data flow 300 comprises an identification data layer 320, wherein data received in input data layer 310 is processed to identify data forming the bases of a reactive interface event, including, without limitation, multi-modal non-verbal cues in the data, such as data indicating the shape of a mouth, a pose, or the condition of a person's eyes (for example, the shape of the visible portion of the eye). According to various embodiments, the computing platform implementing an emotion-aware reactive interface applies one or more recognition algorithms (for example, a facial recognition algorithm) and trained models (for example, scalable object detection using deep neural networks) to generate data in identification data layer 320.

In certain embodiments, identification data determined at identification data layer 320 includes expression data 321. In the non-limiting example of FIG. 3, expression data 321 includes multi-modal non-verbal cues found in image data which may be correlated with one or more candidate emotions. As an illustrative example, a number and size of identified teeth in an image can be a multi-modal non-verbal cue as to the state of a subject's mouth, from which probabilities as to a subject's emotional state can be inferred.

In some embodiments, identification data determined at identification data layer 320 includes gesture data 323. Referring to the non-limiting example of FIG. 3, gesture data 323 includes data specifying the identity and position within the image of recognized body parts, and shapes corresponding to known gestures (for example, a "thumbs-up" sign, or hands inverted to form a "heart" sign).

As shown in the non-limiting example of FIG. 3, identification data determined at identification data layer 320 includes text data 325. According to various embodiments, text data 325 includes, without limitation, text provided as a user input (such as by a typed input in an application window), and text identified from within data received at input data layer 310. Examples of identified text comprising text data 325 include, without limitation, text identified in an image (for example, text in an image of a street sign).

In certain embodiments, identification data determined at identification data layer 320 includes object data 327. In certain embodiments, object data 327 includes data as to the identity and location within an image of recognized objects (for example, cars or plants). According to various embodiments, object data 327 may be obtained by using object detection software, such as the TensorFlow Object Detection API.

According to various embodiments, identification data determined at identification data layer 320 includes, without limitation, scene cue data 329. In some embodiments, scene cue data 329 is based exclusively on environment data 313 or user data 311. According to some embodiments, scene cue data 329 is based on a combination of environment data or user data. Scene cue data 329 includes, for example, data as to identified contextual or personal cues—such as smoke in a picture, or an abundance of cars (perhaps providing a cue that the user is stuck in a traffic jam).

As discussed above, in identification data layer 320, data is processed to identify features or cues (including multi-modal non-verbal cues, such as, for example, data indicating the presence of "rolled eyes" or smiles in an image). The data is further processed in interpretation layer 330 using the identification data determined in identification data layer 320 to determine one or more categorizations. According to various embodiments, the processing performed in interpretation layer 330 is based, at least in part, on data as to multi-modal non-verbal cues found in data received in the input data layer 310.

Referring to the non-limiting example of FIG. 3, categorizations determined in interpretation layer 330 include categorizations of emotion 331. According to various embodiments, categorizations of emotion 331 comprise values of a set of parameters mapped to a set of predetermined emotions (for example, "Happy=0"; "Sad=1"), and which can be utilized as interface events (for example, as an application utilizes a mouse click or key stroke) by an application.

According to certain embodiments, categorizations determined in interpretation layer 330 include categorizations of gesture 333. In some embodiments, categorizations of gesture 333 are determined by applying gesture data 323 to one or more pre-trained models to identify predefined patterns in image data received in image data layer 310 associated with categories of gestures. As used in this disclosure, the term categories of gestures encompasses multiple patterns of image data associated with a single gesture (for example, a "thumbs up," which can be formed with either the right hand or left hand).

In some embodiments, categorizations determined in interpretation layer 330 include categorizations of text 335.

In some embodiments, an emotion-aware reactive interface according to this disclosure will, based on patterns and features identified in a piece of textual data, determine one or more categorizations of the text or user. Patterns and features supporting categorizations of text 335 include, without limitation, word choice, punctuation and typography which can, by themselves, be reliable cues as to a user's emotional state. For example, typographical features, such as capitalization of every word and extensive use of exclamation points, can support a categorization of text as "angry."

As shown in the non-limiting example of FIG. 3, categorizations determined in interpretation layer 330 include, without limitation, categorizations of scene 337. According to certain embodiments, an emotion-aware reactive interface according to this disclosure will, based on object data 327 and scene cues 329, determine a categorization associated with a user, a context 339, or both. As one illustrative example, if object data 327 includes an identification of a plurality of conical party hats, the scene may be categorized as a "party" and categorization of scene data 337 may be determined for the user.

Referring to the non-limiting example of FIG. 3, categorizations determined in interpretation layer 330 can include categorizations of a context associated with a user. Categorizations of a context associated with a user include, without limitation, categories associated with a physical state of a user, such as being well or unwell, awake, asleep or still waking up. In some embodiments, categorizations associated with a state of a user include categorizations associated with a specific activity of a user, for example, "cycling" or "running" or "commuting."

As shown in the illustrative example of FIG. 3, reactive interfaces according to certain embodiments of this disclosure, output reactive interface events 340 based on categorizations determined in interpretation layer 330. According to certain embodiments, the outputted reactive interface events 340 are standardized and contain event data which can be consumed by any application configured to receive reactive interface events. In some events, the content and format of reactive interface events 340 are tailored for a specific application or functionality to be provided by an application. As an illustrative example, in some embodiments, reactive interface events 340 are utilized by an application (for example, avatar application 355) which provides a graphical avatar tracking a user's movements and expressions. In this example, a categorization of an emotion 331 and a categorization of a gesture 333 are prioritized over other categorizations as a basis of a reactive interface event.

According to certain embodiments, a model or control logic for determining reactive interface can be refined or tuned to a particular user. For example, an application may obtain feedback regarding the accuracy of a reactive interface event relative to the user's actual emotion. For example, a communication application which determines graphical content to include in a communication stream by identifying non-verbal multi-modal cues in an image of a user (for example, facial expressions and gestures) may require a user's approval of graphical content it has presented in response to a user input. Over time, the user's inputs approving or disapproving of determined graphical content are collected and may evince patterns in how a user categorizes their own facial expressions and gestures, and data flow 300 can be looped (as shown by the arrow representing feedback loop 345) with different model weights in identification data layer 320 and interpretation layer 330 to tune the performance of the reactive interface.

According to certain embodiments, reactive interface events 340 are utilized by one or more applications 350 to cause graphical effects 351 (for example, a background color associated with a determined mood of a user) or pop-up imagery 353 (for example, displaying a pop-up graphic of a lipstick mark in response to a kissing gesture). In certain embodiments, reactive interface events 340 are utilized by applications 350 to control the appearance and action of an on-screen avatar 355 (for example, as shown in FIG. 9 herein), or alternatively, to control the incidence and appearance of text or SMS visuals 357 (for example, the "fiery" speech bubble shown in FIG. 9 of this disclosure).

Figure 4:
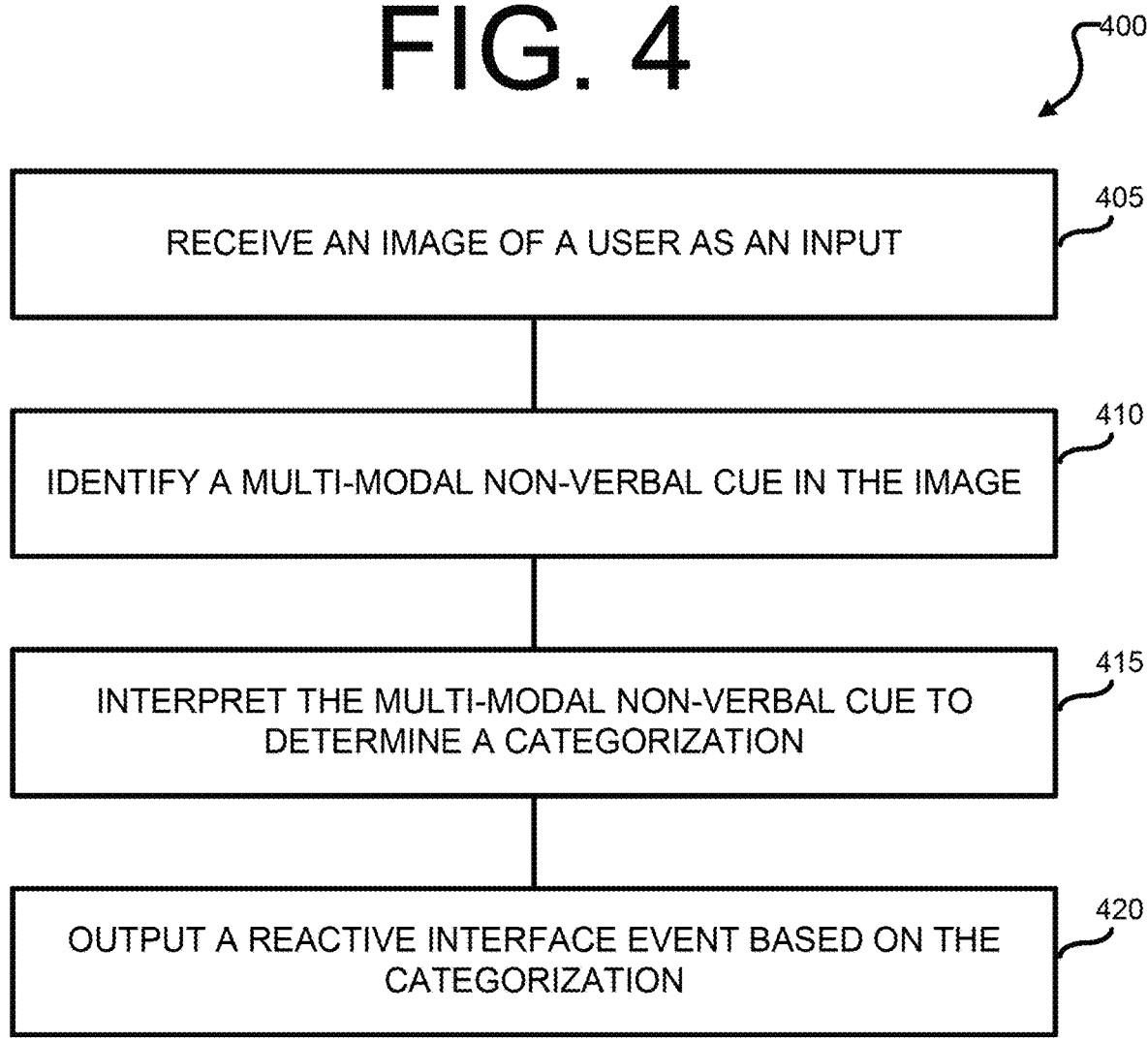
FIG. 4 illustrates operations of a method for implementing an emotion-aware reactive interface according to certain embodiments of this disclosure.

FIG. 4 illustrates operations of a method 400 for implementing an emotion-aware reactive interface according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to certain embodiments, method 400 is implemented on a processor-powered apparatus (for example, a smartphone, or device 100 in FIG. 1) which includes a camera, a memory for storing one or more applications, and sufficient processing resources to perform object recognition. According to some embodiments, the operations of method 400 may be performed across multiple networked machines, with a first device determining a categorization and a second device outputting a reactive interface event.

Referring to the non-limiting example of FIG. 4, method 400 includes operation 405, wherein an electronic device receives an image of a user as an input. According to certain embodiments, the electronic device receives the image of the user via a bus or other intra-machine connection with a camera of the electronic device. In some embodiments, the electronic device receives the image of the user from another device via a network or other inter-machine connection. According to various embodiments, the image of the user is stored in a memory of the device, and the electronic device receives the image by loading the image from memory.

According to various embodiments, at operation 410, the electronic device identifies a multi-modal non-verbal cue in the image. As used in this disclosure, the term multi-modal non-verbal cue encompasses visual content within an image which belongs to one or more modes (for example, indicia of emotion, gestures, objects, features of text, or features of a scene) of expressing an emotion or context other than the standard, or decontextualized meaning of a word. To illustrate the concept of a multi-modal non-verbal cue, consider the word "really," which depending on context and manner of expression, can be used to express a variety of sentiments, including surprise, amazement and irritated skepticism. In this example, an upward eye roll by the speaker when saying "really" would be an example of a multi modal non-verbal cue from which the intended sense of "really" can be determined by a machine.

In some embodiments, at operation 415, after identifying a multi-modal non-verbal cue in the image, the electronic device interprets the multi-modal non-verbal cue to determine a categorization. According to various embodiments, the electronic device applies one or more models to data based on multi-modal non-verbal cues in the image data to determine one or more categorizations (for example, the categorizations shown in interpretation layer 330 of FIG. 3). In some embodiments, the electronic device stores and retains data pairing the identified multi-modal non-verbal cues in the image with the determined categorization, which can be used for tuning and further training interpretive models used by the electronic device.

Referring to the non-limiting example of FIG. 4, at operation 420, the electronic device outputs a reactive interface event based on the categorization. According to certain embodiments, the reactive interface event includes the categorization as well as underlying image data. According to some embodiments, the reactive interface event includes the categorization, as well as data associated with one or more multi-modal non-verbal cues in the image. In various embodiments, the reactive interface event includes one or more pieces of underlying input data (for example, an image or recording of a spoken input) and data separately determined based on the categorization. According to certain embodiments, the reactive interface event comprises only data determined based on the categorization.

Figure 5:
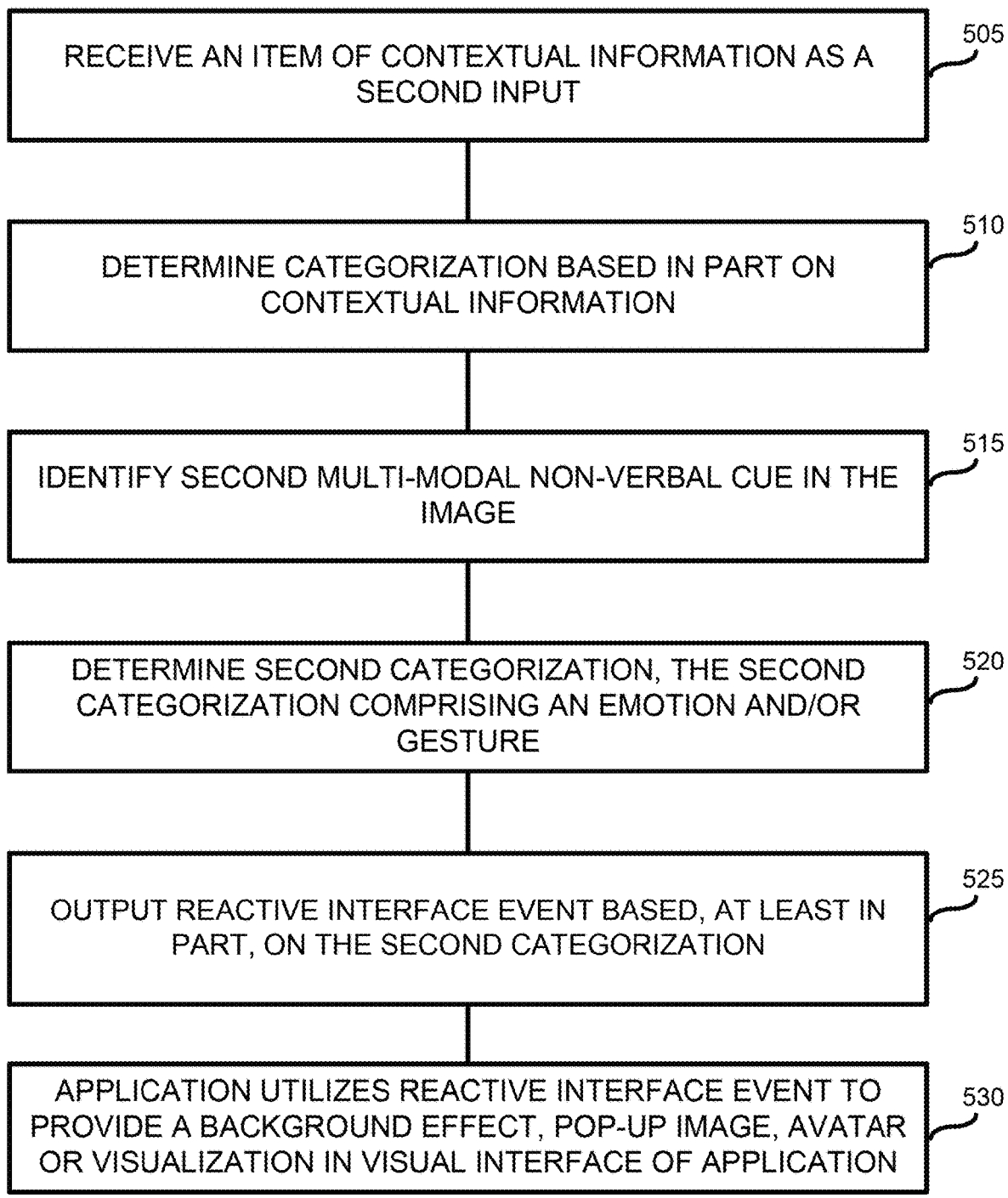
FIG. 5 illustrates operations of a method for implementing an emotion-aware reactive interface according to various embodiments of this disclosure.

FIG. 5 illustrates operations of a method for implementing an emotion-aware reactive interface according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to various embodiments, the operations described with reference to FIG. 5 can be combined, in whole, or in part with the operations described with reference to the non-limiting example of FIG. 4.

Referring to the non-limiting example of FIG. 5, as part of implementing an emotion aware reactive interface, at operation 505, an electronic device can receive an item of contextual information as a second input. Examples of contextual information include, without limitation, information obtained from an application running on the electronic device (for example, a health and fitness application, which provides information reflecting a determination that, based on a user's heart rate and location data, the user is, or has recently gone running), a sensor on the electronic device (for example, a microphone of the device, indicating that the user is in a noisy or crowded location, or alternatively, that the user is breathing heavily and may be in physical distress). Further examples of contextual information received at operation 505 include, without limitation, service data (for example, data from a weather reporting service, such as the API for www.weather.gov) or data stored on the electronic device (for example, contact information, calendar information, such as listings of holidays, birthdays and anniversaries).

In certain embodiments according to this disclosure, at operation 510, the electronic device determines a categorization based, at least in part, on the contextual information obtained at operation 505. According to certain embodiments, the categorization may be of the user's environment (for example, current light or weather conditions), and can serve as the basis of a reactive interface event which can be used to control a background of an interface (for example, as shown in FIG. 9 of this disclosure).

As shown in the non-limiting example of FIG. 5, at operation 515, the electronic device identifies a second multi-modal non-verbal cue in the image (for example, the image received at operation 405 of FIG. 4). According to certain embodiments, the electronic device identifies a plurality of multi-modal non-verbal cues in an image, which can be interpreted together to determine a single categorization. For example, according to some embodiments, the electronic device may identify, as a first multi-modal non-verbal cue, a position and condition of a subject's eye, and as a second multi-modal non-verbal cue, the shape and position of the subject's mouth, and determine a single categorization based on these multi-modal non-verbal cues. In some embodiments, the electronic device may use one multi-modal non-verbal cue to obtain a first categorization associated with one dimension of an image subject's condition (for example, their emotional state), and a second multi-modal non-verbal cue to obtain a second categorization associated with another dimension of the subject's condition (for example, their age or gender).

In some embodiments, at operation 520, the electronic device determines a second categorization, the second categorization comprising a categorization of an image subject's emotion or gesture. In certain embodiments, the second categorization obtained at operation 520 is determined from a data set which includes data associated with multi-modal non-verbal cues as the first categorization (for example, the categorization determined at operation 415 in FIG. 4). In various embodiments, the second category is determined from a separate data set than that used to determine the first categorization.

Referring to the non-limiting example of FIG. 5, at operation 525, the electronic device outputs a reactive interface event which is based, at least in part, on the second categorization determined at operation 520. According to certain embodiments, the reactive interface event includes the second categorization as well as underlying image data. According to some embodiments, the reactive interface event includes the second categorization as well as data associated with one or more multi-modal non-verbal cues in the image. In various embodiments, the reactive interface event includes one or more pieces of underlying input data (for example, an image or recording of a spoken input) and data separately determined based on the categorization. According to certain embodiments, the reactive interface event includes only data determined based on the categorization.

Figure 6:
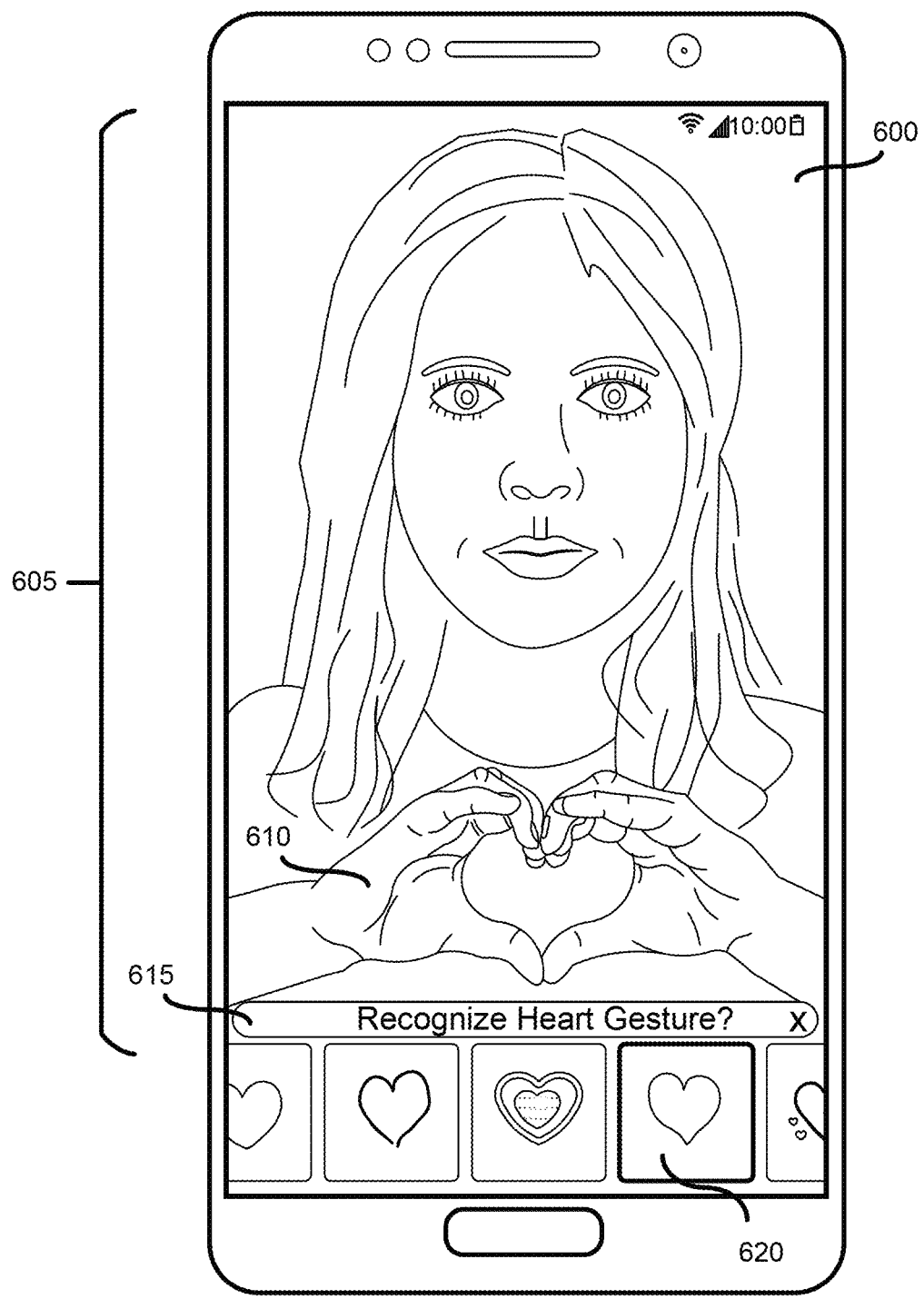
FIG. 6 illustrates operational aspects of an example of an emotion-aware reactive interface according to certain embodiments of this disclosure.

In some embodiments, at operation 530, an application (for example, an application running on the electronic device) receives the reactive interface event output at operation 525, and utilizes the reactive interface event to provide at least one of a background effect, a pop-up image, an avatar or a visualization (for example, the "heart" visualization shown and described in FIG. 6 of this disclosure).

FIG. 6 illustrates operational aspects of an emotion-aware reactive interface according to certain embodiments of this disclosure.

Referring to the non-limiting example of FIG. 6, an application user interface 600 receiving reactive interface events from emotion-aware reactive interface is displayed on a device. According to certain embodiments, the emotion-aware reactive interface receives image data as an input. In this particular example, the image data is received from a camera on the device, and displayed in an upper portion 605 of user interface 600. According to certain embodiments, the emotion-aware reactive interface identifies multi-modal non-verbal cues in the image, such as identifiable gestures. In the non-limiting example of FIG. 6, the multi-modal cues in the gesture include the subject's forming a "heart" sign 610 with her hands. In certain embodiments, the emotion-aware reactive interface identifies heart sign 615 as a multi-modal non-verbal cue in the image and determines a category, such as "heart gesture," associated with the multi-modal non-verbal cue, and outputs a reactive interface event which is determined based on the categorization. As shown in this illustrative example, the application providing user interface 600 consumes the reactive interface event, to present an assortment of graphic content, including a selected "heart" graphic 620. Additionally, the application providing user interface 600 presents a user prompt 615, inviting the user to accept or reject the application's suggestion to insert "heart" graphic 620 into a message. According to certain embodiments, a user's response to user prompt 615 can be used to tune models for identifying image data and/or interpreting multi-modal non-verbal cues to determine categorizations.

Figure 7:
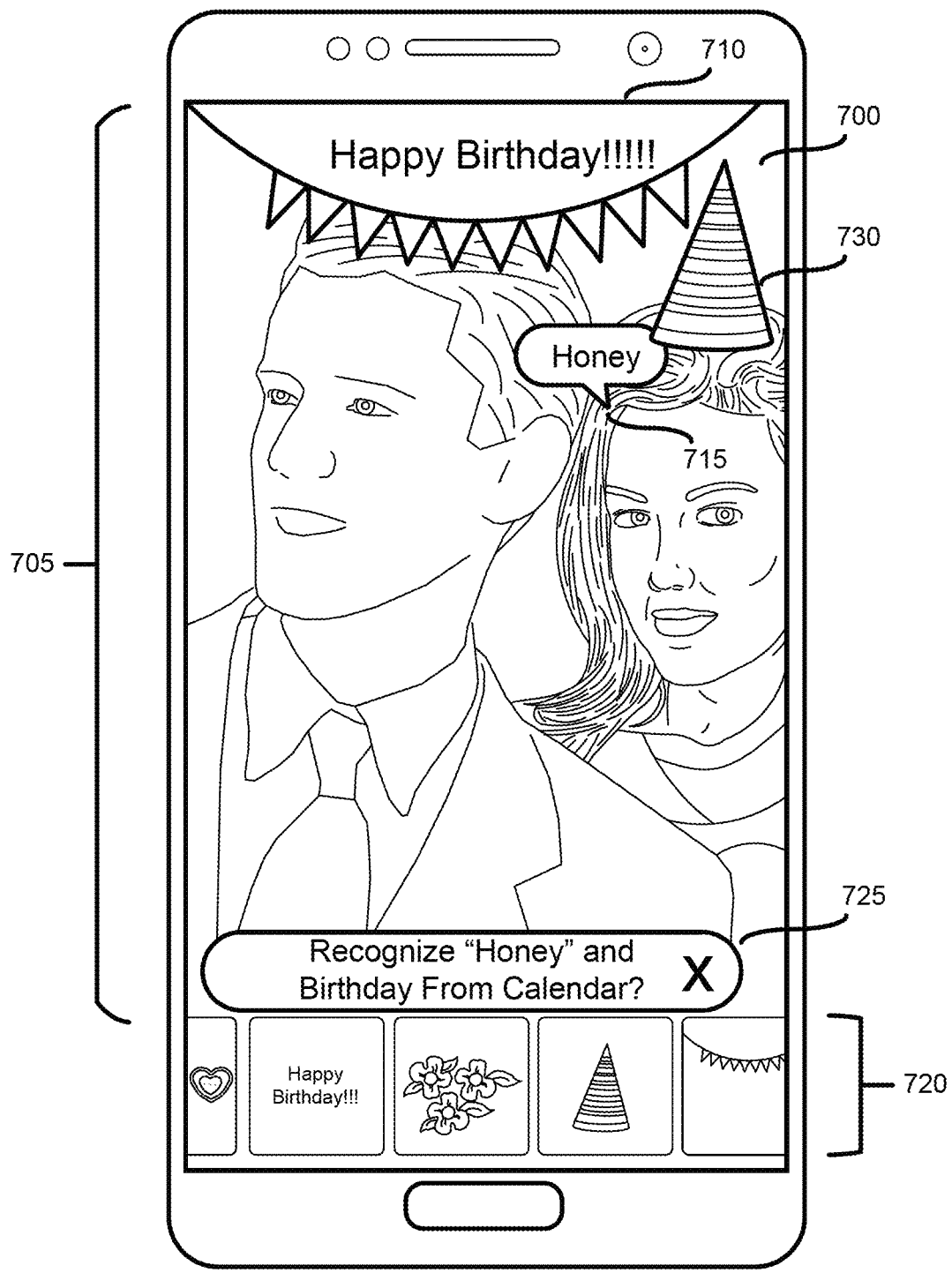
FIG. 7 illustrates operational aspects of an example of an emotion-aware reactive interface according to certain embodiments of this disclosure.

FIG. 7 illustrates operational aspects of an emotion-aware reactive interface according to certain embodiments of this disclosure.

Referring to the non-limiting example of FIG. 7, a user interface 700 of an application (for example, a photo-oriented social media application) is presented on the screen of an electronic device. In this example, an emotion-aware reactive interface receives image data from a camera of the device, which is shown in the upper portion 705 of user interface 700. In this illustrative example, the emotion-aware reactive interface identifies multi-modal non-verbal cues, including, without limitation, the identity and facial expressions of the subjects in the photographic. Additionally, the emotion-aware reactive interface receives contextual information regarding the male subject of the photo, namely, his nickname "Honey" and his birthday from a calendar application. According to certain embodiments, the emotion-aware reactive interface determines "happy birthday" as a categorization for the image, and outputs a reactive interface event based on the categorization. In this non-limiting example, the application utilizes the reactive interface event by automatically selecting graphical content from UI carousel 720. Specifically, the application selects the "Happy Birthday" bunting 710 as a header/filter and speech bubble 715, which contains the male subject's assigned nickname "Honey." Further, the application utilizes the reactive interface event in conjunction with the identification of the female subject's face to insert a "party hat" graphic/filter 730 on the identified top of the female subject's head. According to certain embodiments, the application also outputs a user prompt 725, by which the user can approve or reject the content added to the image based on the reactive interface event.

Figure 8:
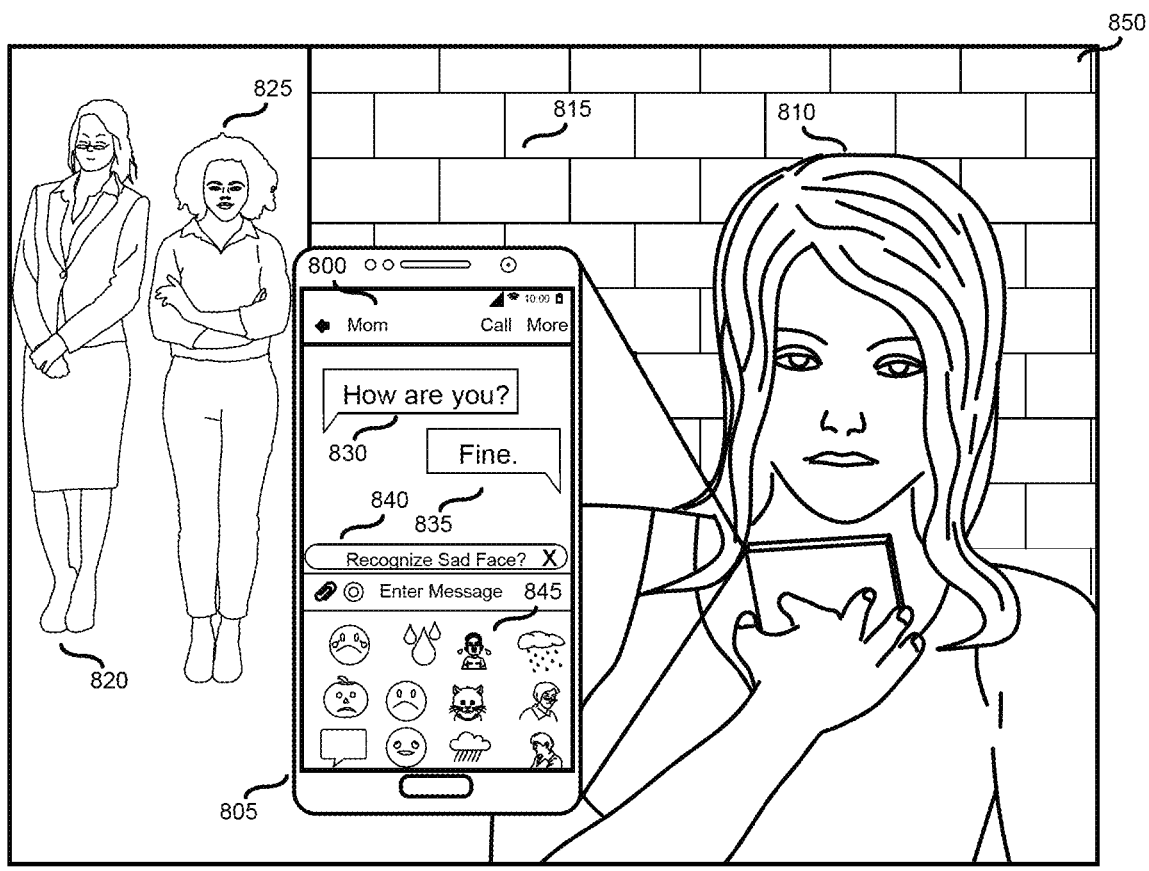
FIG. 8 illustrates operational aspects of an example of an emotion-aware reactive interface according to various embodiments of this disclosure.

FIG. 8 illustrates operational aspects of an emotion-aware reactive interface according to various embodiments of this disclosure.

In the non-limiting example of FIG. 8, a depiction of a device 805 presenting a user interface 800 of an application utilizing reactive interface events is superimposed over a depiction of a scene 850 captured by a camera of device 805.

As shown in this illustrative example, scene 850 contains several elements, which are captured as image data by the camera of device 805. In the foreground and screen dominant position, is the face of device user. The background includes a wall 815, first background subject 820 and second background subject 825. In this example, the emotion-aware reactive interface identifies several multi-modal non-verbal cues in the image, including facial features of device user 810, as well as facial features of first background subject 820 and second background subject 825. According to certain embodiments, the emotion-aware reactive interface prioritizes multi-modal non-verbal cues in the image. As an example, the emotion-aware reactive interface may exclude multi-modal non-verbal cues associated with background subjects 820 and 825 based on their size and position within the image frame. Accordingly, the emotion-aware reactive interface may only retain multi-modal non-verbal cues associated with device user 810, based on her position in the foreground and screen dominant of the image.

In certain embodiments, the emotion-aware reactive interface interprets multi-modal non-verbal cues obtained from image data of device user 810's face (for example, a drooping mouth) and outputs a reactive interface event based on the category "sad face." As shown in the non-limiting example of FIG. 8, device user 810 is communicating, via a chat application, with a second user identified as "Mom."

Referring to the non-limiting example of FIG. 8, device user 810 responds to the query 830 "How are you?" with the one-word response 835 "Fine." While the dictionary definition of the word "fine" corresponds to a generally good, or happy emotional and/or physical condition, as used, the word "fine" can, with non-verbal contextual cues, take on a much broader range of intended meanings than its dictionary definition.

In the non-limiting example of FIG. 8, the emotion-aware reactive interface prioritizes, or assigns greater weight to non-verbal multi modal cues, such as facial expression and pose, than the text of the word "fine" in determining a categorization based on the word "fine." Additionally, the emotion-aware reactive interface may apply a rule or linguistic model (for example, a rule correlating sentence length and complexity with emotional state) to infer a context from the terseness of user 810's response that she is not "fine" in the dictionary sense of the word. Utilizing a reactive interface event based on the category "sad face", the texting application presents user 810 with an assortment of graphics 845 to insert into her communication for providing clarifying context to one-word response 835. Additionally, the application presents a user prompt 840 which allows the user to reject the application's suggestions for automatic contextual enrichment of one-word response 835.

In certain embodiments, the user's utilization of user prompt 840 provides a feedback mechanism (akin, for example, to feedback loop 345 in FIG. 3) which can be used to tune models for identifying and interpreting multi-modal non-verbal cues in image data. Depending on the text inputted by a user, the relative priorities or weightings of non-verbal multi-modal cues relative to textual inputs in determining categorizations may be dynamically adjusted. For example, certain words or phrases, such as "I am exhausted" are less susceptible to contextual and gestural modification of their intended meaning than phrases like, "fine."

FIG. 9 illustrates operational aspects of an example 900 of an emotion-aware reactive interface according to various embodiments of this disclosure.

By way overview, the non-limiting example of FIG. 9 illustrates an electronic device (not shown) receiving an image of a first user who is male (identified in FIG. 9 as "Bob") waking up. The electronic device interprets the received image, identifies one or more multi-modal non-visual cues in the image, determines a categorization of an aspect of the image data based on the identified multi-modal non-visual cue, and generates a reactive interface event. In this illustrative example, the reactive interface event is utilized by a textual communication application to select an avatar, and the avatar is used to contextually enrich a textual communication session between the first user and a second user.

In the non-limiting example of FIG. 9, a reactive interface application on the first user ("Bob's") phone receives, as an input, an image 905 of Bob. According to certain embodiments, the reactive interface application may receive image data from one or more cameras on the first user's device (for example, a smartphone or device 100 in FIG. 1) at preset intervals, or in response to preset triggers, such as movement or position of the device. According to certain embodiments, in addition to image 905, the reactive interface application also receives contextual information, such as location information, and a motion history of the device. In some embodiments, the reactive interface application also receives service data, such as a feed of local weather conditions. According to various embodiments, the reactive interface application also receives data stored on the device, such as a user profile for first user Bob, which contains information regarding his gender, avatar settings, and feedback history with respect to reactive interface events.

According to certain embodiments, the reactive interface application identifies non-verbal multi-modal cues in the image 905 of the first user. As shown in this illustrative example, non-verbal multi-modal cues in image 905 include the subject's gesture (arms raised, with both fists clenched), and facial features (closed eyes, wide open mouth).

Next, the reactive interface application determines, based on the non-verbal multi-modal cues in image 905 and contextual information (for example, a location corresponding to the coordinates of Bob's home in a user profile) a categorization. For example, the categorization may be that Bob's current physical state is "sleepy." The reactive interface application outputs a reactive interface event based on this categorization. In this non-limiting example, in addition to being based on a categorization of Bob's physical state determined by the reactive interface application, the reactive interface event also includes the message "What's up?" to a second user, and contextual information regarding the weather at Bob's current location.

According to some embodiments, the reactive interface event is consumed by the textual communication application. In this non-limiting example, the textual communication application utilizes the reactive interface event to choose a contextually appropriate avatar from a set of avatars 910. In some embodiments, set of avatars 910 includes avatar 915*a* which is selected in response to a reactive interface event based on a "happy" categorization of multi-modal non-verbal cues in the image data. In this particular example, set of avatars 910 also includes avatar 915*b*, which is selected in response to a reactive interface event based on an "unhappy" categorization of multi-modal non-verbal cues in the image data. Further, set of avatars 910 includes avatar 915*c*, which is selected in response to a reactive interface event based on a "sleepy" categorization of multi-modal non-verbal cues in the image data.

As shown in the non-limiting example of FIG. 9, in response to a reactive interface event based on a "sleepy" categorization of the multi-modal non-verbal cues in image 905, the reactive interface application selects avatar 915*c*.

In addition to selecting avatar 915*c*, the textual communication application utilizes other data provided in the reactive interface event in a user interface screen 920, which is visible to both first user Bob and a second user, represented by avatar 925. For example, the textual communication application utilizes the contextual information regarding Bob's location to generate background graphic 930, indicating that the weather at Bob's location is partially sunny. Additionally, in this non-limiting example, the reactive interface event utilized by the textual communication application is based on both a determined physical condition of the first user, but also the first user's textual input to the application. As such, user interface screen 920 displays both Bob's typed input 935, as well as an avatar 940, which comprises an instance of selected avatar 915*c*.

Referring to the non-limiting example of FIG. 9, in addition to outputting a reactive interface event based on, inter alia, image 905 of first user Bob, the textual communication application receives, via a network, a second reactive interface event from a second user, with whom first user Bob is texting. As shown in FIG. 9, the textual communication application utilizes the second reactive interface event to select and present a second avatar, as well as automatically present contextually stylized speech bubble 945. According to certain embodiments, the color scheme, and "rising flame" upper border of contextually stylized speech bubble 945 specify which of the multiple possible meanings of the one word phrase "Really?" was intended by the second user. In this non-limiting example, avatar 925 and contextually stylized speech bubble 945 precisely convey that the second user is displeased by the fact that first user Bob is sleepy at 12:34 p.m.

While FIG. 9 describes the utilization of reactive interface events in the context of providing improved communicative precision to short-form inputs (for example, one word sentences of the form "Really?") in a texting application, other scenarios are possible and within the contemplated scope of this disclosure. For example, according to certain embodiments, reactive interface events output by the reactive interface application described with reference to FIG. 9 could instead, be used by an alarm clock application for heavy sleepers. For example, a reactive interface event based on a categorization of the user's wakefulness state could be used to control a "snooze" or volume function of the alarm, by raising the volume of the alarm in response to an image indicating that a user is not fully awake.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method of providing an emotion-aware reactive interface in an electronic device, the method comprising:
  receiving, by a processor, image data from an image captured by a camera of the electronic device as an input via a user interface of an application on a display of the electronic device;
  analyzing the image data, wherein the image comprises facial features and a plurality of subjects in the image to identify one or more subjects associated with the facial features, wherein a plurality of multi-modal non-verbal cues are associated with the one or more subjects corresponding to the facial features;
  prioritizing multi-modal non-verbal cues of the plurality of multi-modal non-verbal cues based on a size and a position of the one or more subjects associated with the multi-modal non-verbal cues within the captured image and determining a first multi-modal non-verbal cue to have a higher priority relative to other multi-modal non-verbal cues associated with the captured image;
  determining a categorization of the first multi-modal non-verbal cue, wherein the categorization is determined from a set of categorizations defined in an interpretation layer; and outputting a reactive interface event determined based on the first multi-modal non-verbal cue and its categorization,
wherein the reactive interface event is consumed by the application to provide one or more selectable items of graphic content on the user interface of the application provided on the display of the electronic device.

2. The method of claim 1, wherein the categorization of the first multi-modal non-verbal cue is associated with at least one of an emotion, a gesture, a text, a scene, or a context.

3. The method of claim 1, further comprising:
determining a second multi-modal non-verbal cue to have a higher priority relative to other multi-modal non-verbal cues associated with the captured image;
determining a second categorization of the second multi-modal non-verbal cue; and
outputting the reactive interface event determined based in part on the second multi-modal non-verbal cue and the second categorization.

4. The method of claim 1, wherein the plurality of multi-modal non-verbal cues comprise at least one of a facial expression, a pose, a gesture, a text, an object, or a scene.

5. The method of claim 1, wherein the reactive interface event is utilized by an application on the electronic device to provide at least one of a background effect, a pop-up image, an avatar, or a visualization in a visual interface of the application.

6. An apparatus comprising:
a display;
a camera; and
a processor configured to:
receive, by the processor, via a user interface of an application on the display, image data from an image captured by the camera of the apparatus as an input,
analyze the image data comprising facial features with a plurality of subjects in the image to identify one or more subjects associated with the facial features, wherein a plurality of multi-modal non-verbal cues are associated with the one or more subjects corresponding to the facial features,
prioritize multi-modal non-verbal cues of the plurality of multi-modal non-verbal cues based on a size and a position of the plurality of subjects associated with the multi-modal non-verbal cues within the captured image and determine a first multi-modal non-verbal cue to have a higher priority relative to other multi-modal non-verbal cues associated with the captured image,
determine a categorization of the first multi-modal non-verbal cue, wherein the categorization is determined from a set of categorizations defined in an interpretation layer, and
output a reactive interface event determined based on the first multi-modal non-verbal cue and its categorization,
wherein the reactive interface event is consumed by the application to provide one or more selectable items of graphic content on the user interface of the application provided on the display.

7. The apparatus of claim 6, wherein the categorization of the first multi-modal non-verbal cue is associated with at least one of an emotion, a gesture, a text, a scene, or a context.

8. The apparatus of claim 6, wherein the processor is further configured to:
determine a second multi-modal non-verbal cue to have a higher priority relative to other multi-modal non-verbal cues associated with the captured image,
determine a second categorization of the second multi-modal non-verbal cue, and
output the reactive interface event determined based in part on the second multi-modal non-verbal cue and the second categorization.

9. The apparatus of claim 6, wherein the plurality of multi-modal non-verbal cues comprise at least one of a facial expression, a pose, a gesture, a text, an object, or a scene.

10. The apparatus of claim 6, wherein the reactive interface event is utilized by an application on the apparatus to provide at least one of a background effect, a pop-up image, an avatar, or a visualization in a visual interface of the application.

11. A non-transitory computer-readable medium comprising program code, which when executed by a processor, causes the processor to:
receive, by the processor, via a user interface of an application on a display of an electronic device, image data from an image captured by a camera of the electronic device as an input,
analyze the image data comprising facial features with a plurality of subjects in the image to identify one or more subjects associated with the facial features, wherein a plurality of multi-modal non-verbal cues are associated with the one or more subjects corresponding to the facial features,
prioritize multi-modal non-verbal cues of the plurality of multi-modal non-verbal cues based on a size and a position of the one or more subjects associated with the multi-modal non-verbal cues within the captured image and determine a first multi-modal non-verbal cue to have a higher priority relative to other multi-modal non-verbal cues associated with the captured image,
determine a categorization of the first multi-modal non-verbal cue, wherein the categorization is determined from a set of categorizations defined in an interpretation layer, and
output a reactive interface event determined based on the first multi-modal non-verbal cue and its categorization,
wherein the reactive interface event is consumed by the application to provide one or more selectable items of graphic content on the user interface of the application provided on the display.

12. The non-transitory computer-readable medium of claim 11, wherein the categorization of the first multi-modal non-verbal cue is associated with at least one of an emotion, a gesture, a text, a scene, or a context.

13. The non-transitory computer-readable medium of claim 11, further comprising program code, which, when executed by the processor, causes the processor to:
determine a second multi-modal non-verbal cue to have a higher priority relative to other multi-modal non-verbal cues associated with the captured image,
determine a second categorization of the second multi-modal non-verbal cue, and
output the reactive interface event determined based in part on the second multi-modal non-verbal cue and the second categorization.

14. The non-transitory computer-readable medium of claim 11, wherein the plurality of multi-modal non-verbal cues comprise at least one of a facial expression, a pose, a gesture, a text, an object, or a scene.

* * * * *

UNITED STATES PATENT AND TRADEMARK OFFICE
CERTIFICATE OF CORRECTION

| | |
|---|---|
| PATENT NO. | : 11,334,376 B2 |
| APPLICATION NO. | : 16/184601 |
| DATED | : May 17, 2022 |
| INVENTOR(S) | : Jihee Kim et al. |

It is certified that error appears in the above-identified patent and that said Letters Patent is hereby corrected as shown below:

On the Title Page

Column 1, Item (54), Line 1, and in the Specification, Column 1, Line 1, "EMOTION-AW ARE" should read --EMOTION-AWARE--.

Signed and Sealed this
Twenty-third Day of August, 2022

Katherine Kelly Vidal
*Director of the United States Patent and Trademark Office*